United States Patent
Manikfan

(10) Patent No.: US 10,686,327 B2
(45) Date of Patent: Jun. 16, 2020

(54) ENERGY STORAGE CONTROLLER

(71) Applicant: Honeywell International Inc., Morris Plains, NJ (US)

(72) Inventor: Sameer D Manikfan, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 161 days.

(21) Appl. No.: 15/953,124

(22) Filed: Apr. 13, 2018

(65) Prior Publication Data

US 2019/0319477 A1 Oct. 17, 2019

(51) Int. Cl.
*H02J 7/04* (2006.01)
*G06F 1/28* (2006.01)
*H02J 3/32* (2006.01)
*G06N 3/04* (2006.01)
*H02J 7/02* (2016.01)

(52) U.S. Cl.
CPC .............. *H02J 7/042* (2013.01); *G06F 1/28* (2013.01); *G06N 3/04* (2013.01); *H02J 3/32* (2013.01); *H02J 7/027* (2013.01); *H02J 2203/20* (2020.01)

(58) Field of Classification Search
CPC ... H02J 7/042; H02J 3/32; H02J 7/027; G06F 1/28; G06N 3/04

USPC .......................................................... 307/20
See application file for complete search history.

(56) References Cited

U.S. PATENT DOCUMENTS

| | | | |
|---|---|---|---|
| 8,332,342 B1 | 12/2012 | Saha et al. | |
| 8,552,686 B2 | 10/2013 | Jung et al. | |
| 8,970,178 B2 * | 3/2015 | Berkowitz | H01M 10/44 320/139 |
| 9,026,347 B2 | 5/2015 | Gadh et al. | |
| 9,461,496 B1 | 10/2016 | Zhang et al. | |
| 9,509,176 B2 | 11/2016 | Carter et al. | |
| 9,660,450 B2 | 5/2017 | Li et al. | |
| 2014/0215235 A1* | 7/2014 | Lipasti | G06F 1/3206 713/320 |
| 2017/0338667 A1* | 11/2017 | Loonen | H01M 10/0525 |

* cited by examiner

*Primary Examiner* — Michael R. Fin

(57) ABSTRACT

A system, method, and non-transitory computer readable medium provide for an energy storage controller. The system includes battery, a charging circuit, and an energy storage controller (ESC) coupled to the battery and the charging circuit. The battery stores and expends energy with an electrical grid. The charging circuit regulates a rate of energy stored in the battery. The ESC receives controller inputs; determines a control error of the battery based the controller inputs used in a charging controller echo state network (ESN); determines a model error of the battery based on the controller input used in a battery model ESN; and adjusts the regulated rate of energy that the charging circuit stores in the battery based on the control error and the model error.

17 Claims, 8 Drawing Sheets

ENERGY STORAGE CONTROLLER

TECHNICAL FIELD

This disclosure relates generally to energy storage. More specifically, this disclosure relates to hardware acceleration of software based intelligent control systems for energy storage.

BACKGROUND

Energy storage is a fundamental problem or limitation that results in waste of energy at one time and shortage of energy at other times. This waste or shortage occurs because electricity generated by conventional sources such as thermal power plants are not always consumed as the electricity is produced. Thermal power plants need to run at their peak load at all times to maximize efficiency in power generation. If the peak output is sufficient to meet the peak demand, then energy is wasted during off peak hours. If the power plant output does not meet peak demand, but meets demand during off peak hours, then there is energy shortage during peak hours. If the power plant output capacity is increased to meet the peak demand, then the wastage of energy due to inefficiency increases. Lack of balance between demand and supply also lead to grid failures and power outages that cost the power infrastructure companies.

SUMMARY

This disclosure provides an energy storage controller.

In a first embodiment, a system includes battery, a charging circuit, and an energy storage controller (ESC) coupled to the battery and the charging circuit. The battery stores and expends energy with an electrical grid. The charging circuit regulates a rate of energy stored in the battery. The ESC receives controller inputs; determines a control error of the battery based the controller inputs used in a charging controller echo state network (ESN); determines a model error of the battery based on the controller input used in a battery model ESN; and adjusts the regulated rate of energy that the charging circuit stores in the battery based on the control error and the model error.

In a second embodiment, a method includes receiving controller inputs; determining a control error of a battery based the controller inputs used in a charging controller echo state network; determining a model error of the battery based on the controller input used in a battery model echo state network; and adjusting a rate of energy that a charging circuit stores in the battery based on the control error and the model error.

In a third embodiment, a non-transitory machine-readable medium is encoded with executable instructions that, when executed, cause one or more processors to receive controller inputs; determine a control error of a battery based the controller inputs used in a charging controller echo state network; determine a model error of the battery based on the controller input used in a battery model echo state network; and adjust a rate of energy that a charging circuit stores in the battery based on the control error and the model error.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
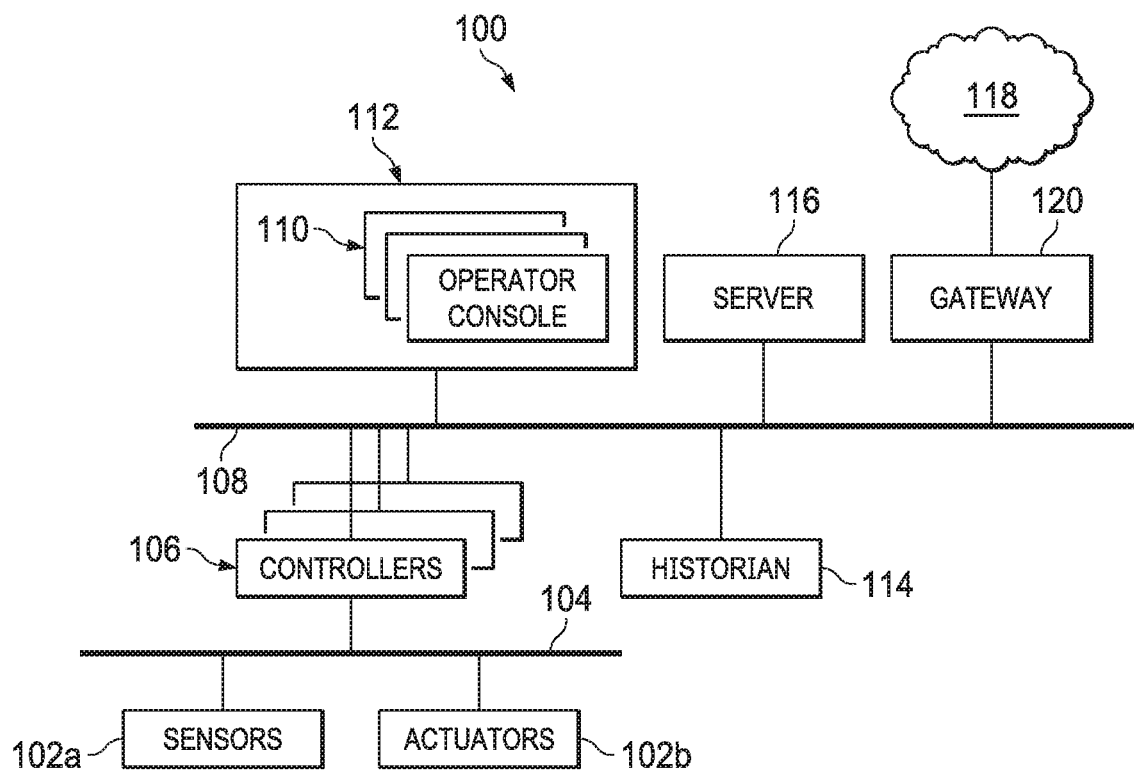
FIG. 1 illustrates an example industrial process control and automation system according to this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Along with the problems discussed in the background, lack of balance between demand and supply also leads to grid failures and power outages that cost the power infrastructure companies.

A possible solution to these problems is introduction of grid connected energy storage systems in the form of high capacity batteries and fuel cells. The primary function of such energy storage systems is to function as a buffer between supply and demand, so that power plants do not have to run to meet the peak demand, rather they need to generate energy to meet the energy demand over a period of time.

Energy storage systems are also required for grid integration of renewable energy sources such as photovoltaic (PV) solar and wind energy. Since these renewable sources do not generate a constant output power throughout the day there is a need to store the energy produced and make it available when there is no generation throughout the day. Also, photovoltaic solar generates direct current (DC) energy that is stored in batteries. The DC output from a battery when it is discharged is converted to alternating current (AC) and supplied to a grid.

Electric vehicles also require energy to be stored in batteries. Batteries in electric vehicles can act as buffers to store energy during off peak hours and make the energy available to the grid when the vehicles are not running.

With time of the day pricing of electricity, owners of energy storage systems have a chance to earn a profit by buying energy and storing it during off peak hours when energy demand is low and sell energy at a high price during peak hours when energy demand is high. Power generation companies could move to time of the day pricing of electricity as a means of load balancing and shift some of the peak loads during off peak hours. Energy storage systems connected to the grid facilitate load balancing and allow its owners to earn a profit. Such profits are a win-win for generators, distributors and consumers and less than the cost of wasted energy due to not having energy storage systems.

Batteries are the most expensive subsystem in an energy storage system. Due to technology limitations in modeling and control of battery charging systems, batteries are usually overdesigned, further increasing the cost of systems equipped with batteries. Battery charging is a process that affects two critical parameters that are difficult to measure and need to be estimated based on other measurable parameters such as voltage, current, temperature, etc. One critical parameter is the state of charge (SOC) and the other parameter is remaining useful life (RUL). Both of these parameters are a non-linear function of measurable parameters such as voltage, current, temperature, etc. There are mathematical models for both battery state of charge and remaining useful life. For state of charge estimation, models based on equivalent circuits and electrochemical process models exist. Artificial neural networks are better models than equivalent circuit models and electrochemical process models. A rate of charging the battery needs to be optimized in order to minimize the charging time and maximize the remaining useful life of battery. Charging very fast may minimize the charging time, but degrades the life of the battery. Charging at a constant current and/or a constant voltage may not be the most optimized charging scheme.

Offline models for batteries have disadvantages to not taking into account the ageing mechanisms of the battery due to charging and the acceleration of ageing mechanisms with methods used for charging. Generating battery models with real time computation is required to model the battery and required to predict failures that pose a safety risk and prevent failures if and when predicted. Computing online models for batteries and generating control signals for battery charging based on the inverse model requires intensive computation if implemented with conventional CPUs. FPGA acceleration of the model estimation and the control system based on the inverse model is a promising solution to address this problem.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving set points or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. This functionality can be used in any other suitable system, and that system need not be used for industrial process control and automation.

Figure 2:
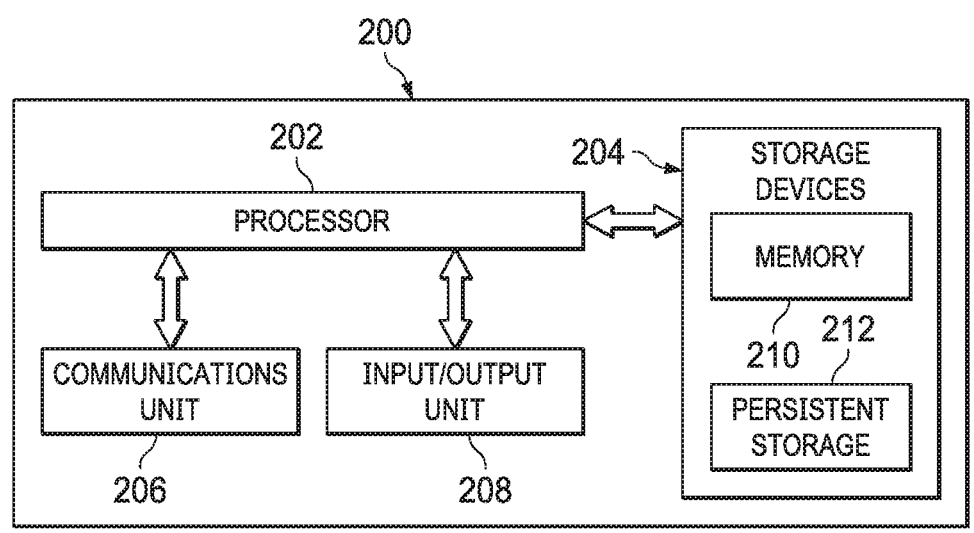
FIG. 2 illustrates an example device for processing the operational status of devices according to this disclosure.

FIG. 2 illustrates an example device according to this disclosure. In particular, FIG. 2 illustrates an example computing device 200. In some embodiments, the computing device 200 could denote an operator station, server, a remote server or device, or a mobile device. The computing device 200 could be used to run applications. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Figure 3:
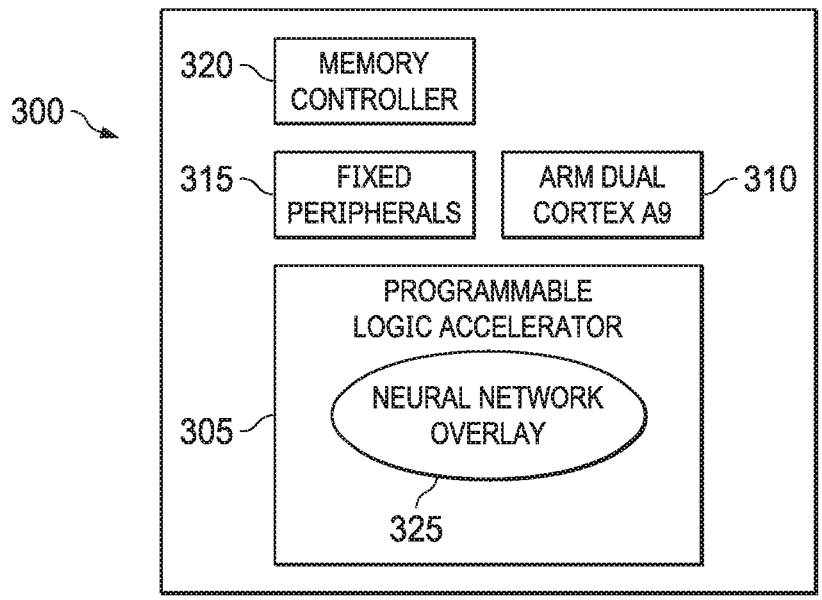
FIG. 3 illustrates an example neural network overlay on a field-programmable gate array (FPGA) according to this disclosure.

FIG. 3 illustrates an example neural network overlay 325 on a control system on chip (SoC) consisting of ARM microprocessors, memory controllers, fixed peripherals, and a field-programmable gate array (FPGA) 300 according to this disclosure. The embodiment of the SoC 300 illustrated in FIG. 3 is for illustration only. FIG. 3 does not limit the scope of this disclosure to any particular implementation.

The SoC 300 includes a programmable logic accelerator 305, a processor 310, fixed peripherals 315, and a memory controller 320. The programmable logic accelerator 305 includes a neural network overlay 325. The processor 310 performs the functions provided below. The fixed peripherals 315 can include any input/output device, such as a keyboard, mouse, touchscreen, etc. The memory controller 320 stores the information related to the enhanced energy storage in an external memory.

Control of battery charge and discharge processes require constructing non-linear dynamic models for state of charge and remaining useful life estimation from measurable parameters such as voltage, current, temperature, time, etc. Real time process control, where the inputs exhibit high orders on non-linearity, require models to be generated and the generated model to be compared with physical battery to minimize the model errors. Models that are generated offline need to be updated when battery models change over the time due to ageing and degradation. Neural network based battery models have an advantage that the models can be updated in real time when models change based on increased model error that leads to retraining of neural network. Also, neural networks are known to perform well when the input data has large and dynamic non linearity. Battery charging and estimation of state of charge and remaining useful life from measurable parameters are non-linear processes.

Realization of neural networks on conventional CPUs with Von Neumann or derived architectures is a challenge due to a very large amount of memory transfers on the input data both for training the neural network and for inference on a trained neural network. Even processors with hardware multipliers cannot avoid memory transfers for the operations in a neural network computations.

Realizing neural networks as a neural network overlay 325 of an FPGA within SoC 300 allows leveraging the best of hardware and software for real-time application. Overlays are hardware libraries implemented in FPGA programmable logic that software can call at run time just like a conventional software library. An overlay is different from a conventional FPGA bit-stream that is configured one time to realize a hardware function in FPGA programmable logic. A conventional FPGA realization does not allow entire software functions to be offloaded to programmable logic as with the case of a neural network overlay 325 of a FPGA within SoC 300.

Training of a neural network is a crucial operation that can make or break the effectiveness of the neural network to perform its intended function. Generating training data sets for a given application has been a challenge since some important data from sensors do not exhibit enough variance to train the neural networks. Presence of wideband noise at inputs also poses a challenge for neural networks. Conventional filtering methods can been applied at inputs. However, such filters pose a risk of removing important information from the sensors especially when applied to inputs with highly dynamic non-linear behavior. Application of Fast Fourier transform on the neural network inputs can be used effectively to deal with these problems as described in this document.

Figure 4:
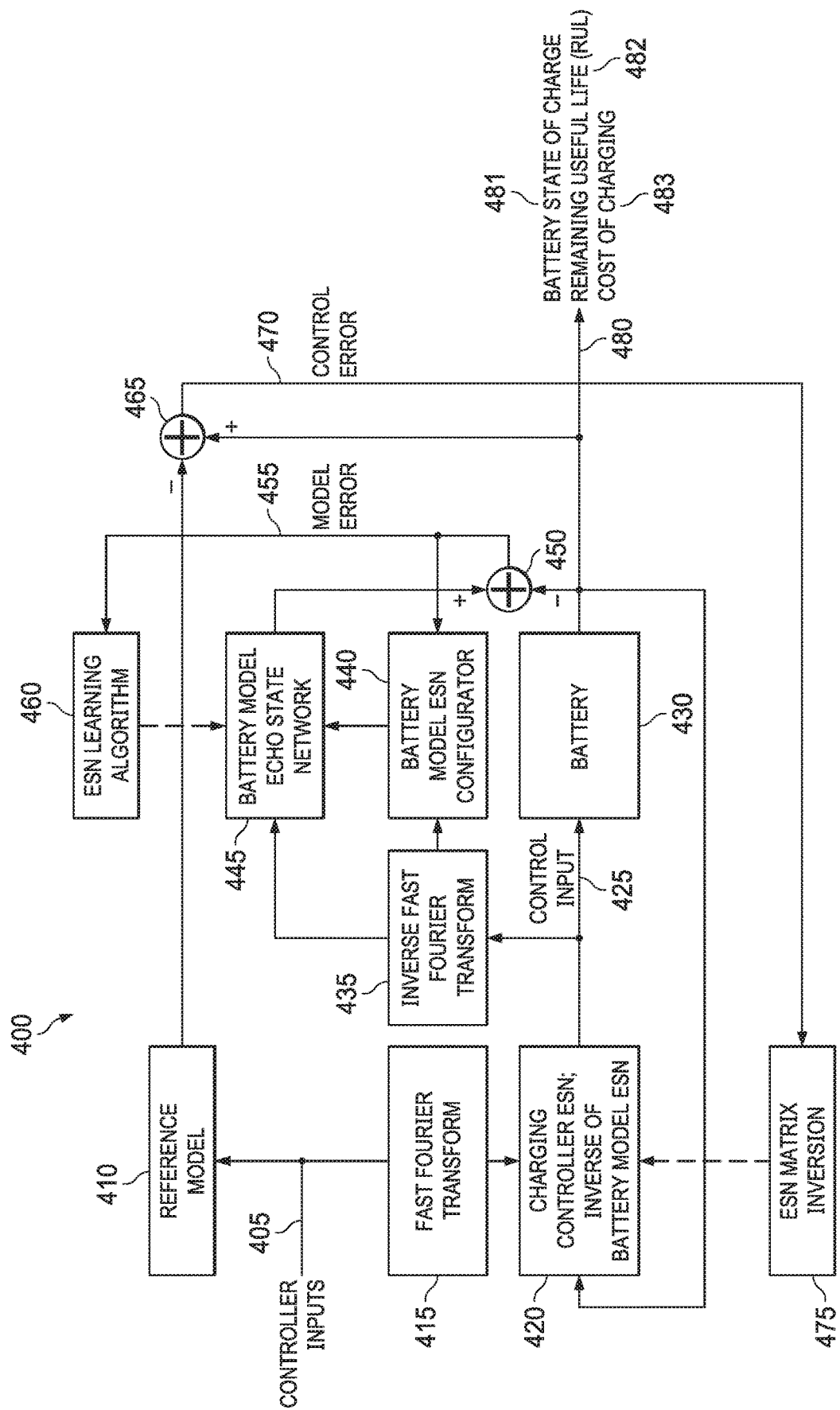
FIG. 4 illustrates an example echo state network (ESN) battery model generator and charging control system according to this disclosure.

FIG. 4 illustrates an example echo state network (ESN) battery model generator and charging control system in an energy storage controller (ESC) system 400 according to this disclosure. The embodiment of the ESC system 400 illustrated in FIG. 4 is for illustration only. FIG. 4 does not limit the scope of this disclosure to any particular implementation.

A schematic diagram of the echo state network battery model generator and charging controller system is depicted in FIG. 4. Echo state networks are a form of recurrent neural networks with an input layer, an output layer, and a reservoir of internal layers with feedback paths. The ESC system can includes controller inputs 405, a reference model 410, a Fast Fourier transform (FFT) 415, a charging controller 420, control input 425, a battery 430, an inverse Fast Fourier transform 435, a battery model ESN configurator 440, a battery model ESN 445, a first subtraction connector 450, model error 455, ESN learning algorithm 460, a second subtraction connector 465, a control error 470, a ESN matrix inversion 475, and controller output 480. The controller outputs includes a battery state of charge 481, a remaining useful life 482, and a cost of charging 483.

The echo state networks 445 and 420 are neural networks with memory. The weights of internal and input layers are fixed and initialized at random. Only the weights of the output neurons are updated and hence these networks are best for realization in an FPGA taking advantage of fast computation of weights only at the output layer and not at the internal and input layers.

This system includes a charging controller echo state network, a configurator neural network for the controller neural network, a battery model echo state network and a battery model generator neural network. Charging controller neural network is an inverse of battery model neural network. Inverse computation relies on matrix inversion of the echo state network and shall be implemented in programmable logic fabric as a pipelined operation.

The system introduces the FFT 415 at the inputs 405 of the controller neural network to overcome two fundamental problems that exist in neural networks.

First, neural networks tend to ignore significant inputs if the training data sets do not have sufficient variance in the training data sets. Variance in time domain or the lack of it can affect both the training of a neural network and also its effectiveness to perform inferences after the neural network is trained with a data set that does not have sufficient variance. Transforming the time domain inputs to frequency domain and processing inputs in the frequency domain could be an effective solution to this fundamental problem. A time domain signal with no variance will have a peak at zero frequency in the frequency domain and zero values at all other frequencies. Similarly, sinusoids at different frequencies will have peaks at their respective frequencies that allows neural networks to differentiate between with similar amplitudes in the time domain but have different frequencies.

Second, neural networks tend to have high convergence time when the inputs have wideband noise. Presence of wideband noise can cause neural networks to train forever and not converge if the noise amplitude is high relative to sensor or input signals (low signal to noise ratio). Applying FFT 415 to transform the time domain input signal to frequency domain has a filtering effect for wideband noise. Unlike conventional filters, FFT 415 does not remove relevant signals at any frequency. Rather, it works based on a basic property of Fourier transform that the frequency spectrum of a wideband noise signal in time domain is a flat signal in frequency domain that would tend to be ignored by a neural network as neural network training algorithms like error back propagation do not train on input signals that have no variance.

Output layer weights of the echo state network are updated based on an echo state network learning algorithm. The controller neural network is also an echo state network obtained by inverting the battery model echo state network implemented in the form of a matrix inversion in FPGA and advanced reduced instruction set computing (RISC) machine (ARM).

A battery model echo state network emulates the physical battery and produces an output that follows the physical battery output. The difference, at the first subtraction connector 450, between the battery model neural network and the physical battery is the model error 455. The echo state network controller 420 controls the battery charging to make the charging behavior close to a reference model to achieve the reference state of charge while maximizing the remaining useful life of the battery and minimizing the cost of energy drawn from the grid. Control error 470 is the difference, which is the second subtraction connector 465, between the output of physical plant of the battery 430 and the reference model 410.

Instead of randomly choosing the weights of the echo state network, this is configured by a configurator neural network that takes human inputs in addition to learning weights online. A human operator can override the auto-learned weights to enhance the usability of the control system when there is data available offline that calls for adjusting the configurator. In the absence of data, as would be the case in the beginning of deployment of a new battery type, the weights of internal reservoir nodes are chosen randomly. The chosen weights are input to another neural network that learns the weights against the convergence time and accuracy of the model generated.

The number of neurons in the inner reservoir layer is fixed for simplicity, but its connectivity and the weights associated with each connection is not fixed. This can be configured by the configurator neural network and will be either randomly chosen or determined by past learning outcomes from weights chosen for a given battery type. This ensures that data available for certain battery types and known data about its ageing mechanisms are taken into account in the training of the neural network. The operator input interface is another feature that should enhance the usability of the configurator. Operator have an option to override the learned weights if there is data available that calls for human intervention.

Figure 5:
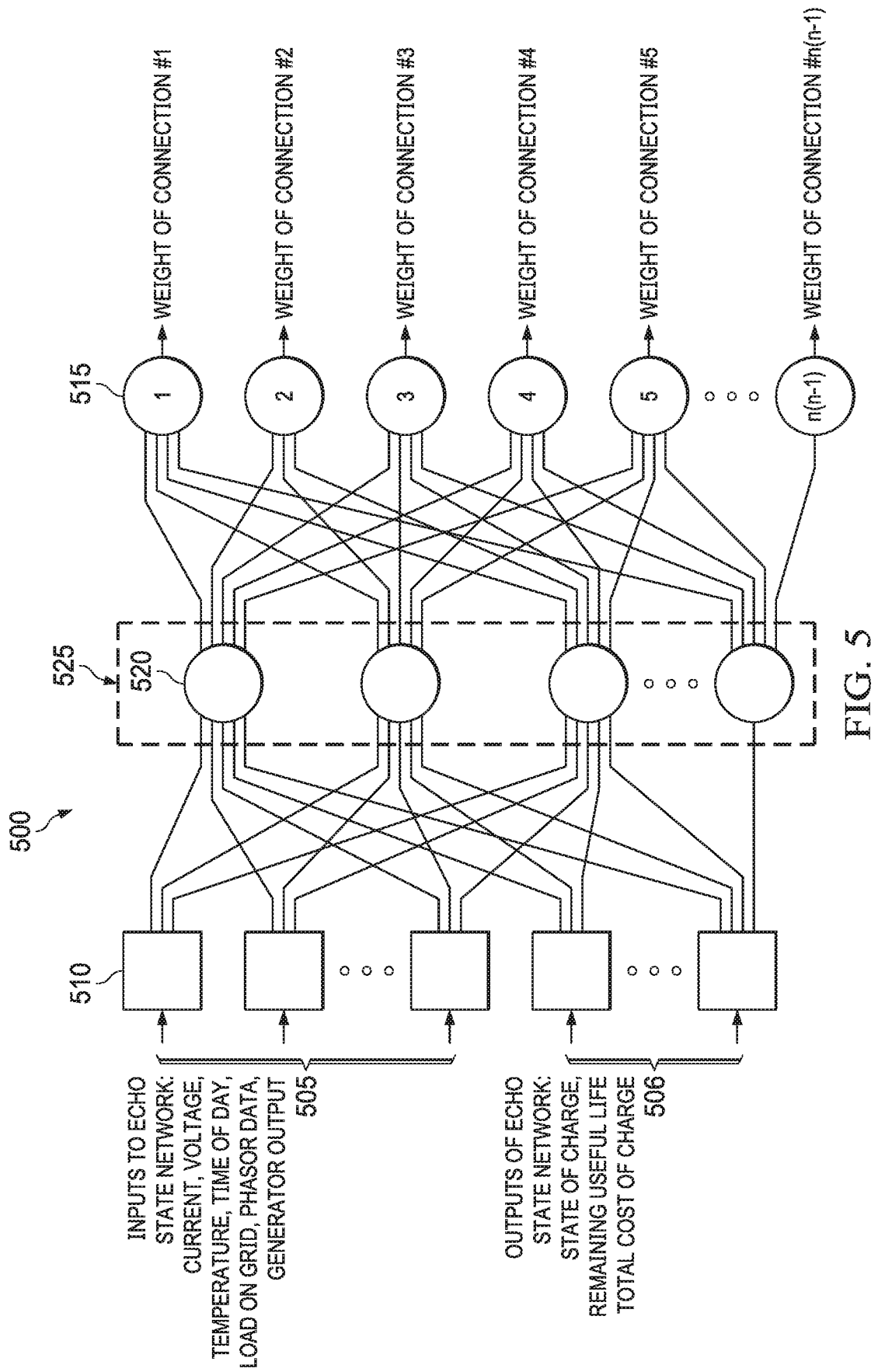
FIG. 5 illustrates an example ESN configurator neural network according to this disclosure.

FIG. 5 illustrates an example ESN configurator neural network 500 according to this disclosure. The embodiment of the ESN configurator neural network 500 illustrated in FIG. 5 is for illustration only. FIG. 5 does not limit the scope of this disclosure to any particular implementation.

The ESN configurator neural network 500 is a feed-forward neural network that learns weights of the neural network using an error back propagation algorithm. The inputs 510 to the configurator are a combination of inputs 505 to the Echo state network battery model generator network and the outputs 506 of the battery model generator network. Inputs 505 to the model generator such as current, voltage, temperature, time of the day, load on grid, frequency of the grid and phasor data are also input to the configurator neural network. Outputs 506 of the battery model generator such as state of charge, remaining useful life, total cost of charging the battery to full capacity are also input to the ESN configurator neural network. The number of outputs 515 of the configurator neural network is based on the following equation:

$$N = n \times (n-1)$$

where n is the number of neurons 520 in the internal reservoir layer 525 of the echo state network for battery model. For each internal neuron 520 in the reservoir layer 525, there are (n−1) associated weights in the configurator neural network. The quantity (n−1) is the maximum number of edges for each neuron 520 in the reservoir layer 525. A neuron 520 can have less than n−1 connections. If a neuron does not have a connection to any other neuron 520 in the reservoir layer 525, then the weight of that connection is taken to be zero. A non-zero value at any weight indicates a valid connection between two neurons in the reservoir layer 525. Schematics of the controller configurator neural network are depicted in FIG. 5.

Figure 6:
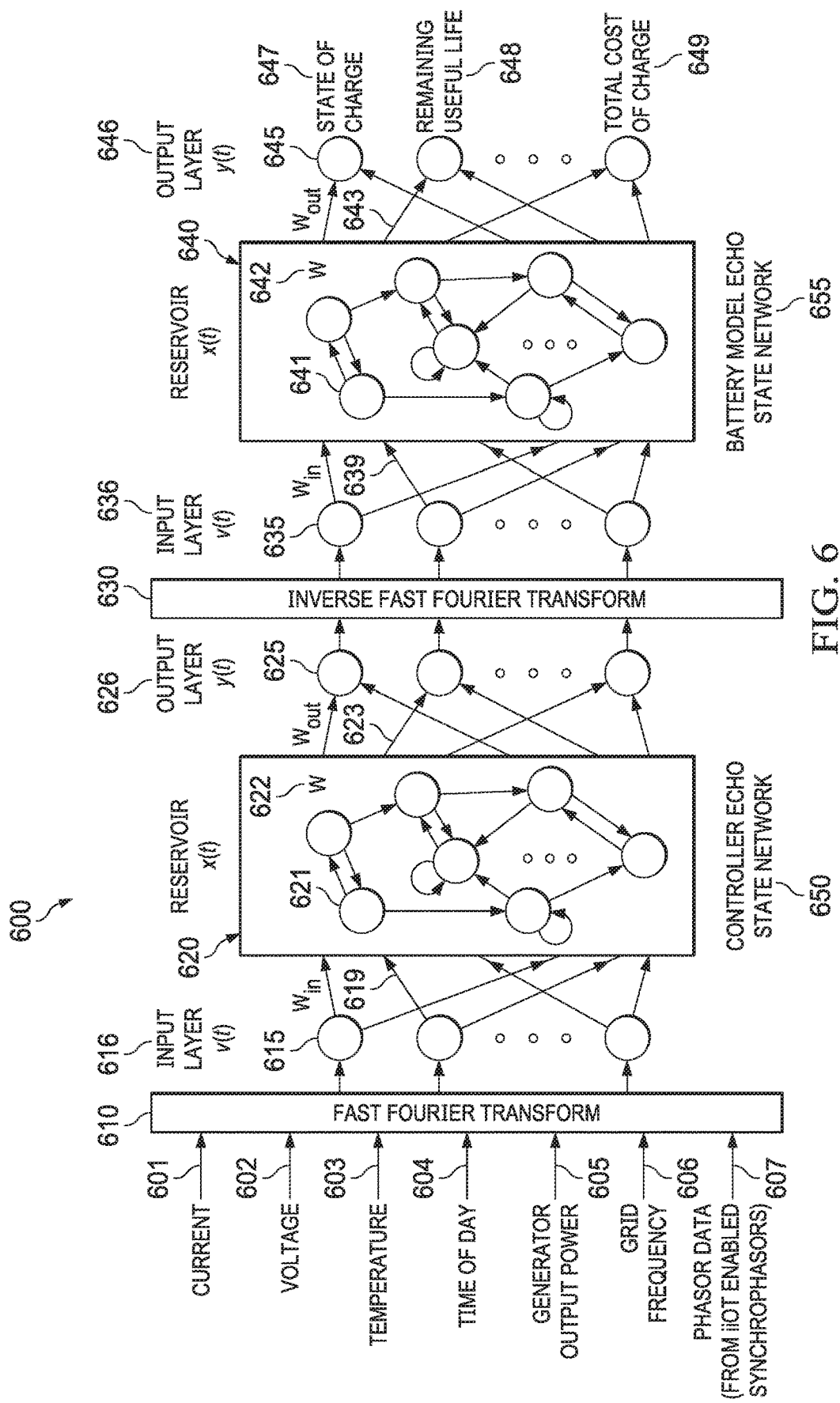
FIG. 6 illustrates an example system with a controller echo state network and battery model echo state network according to this disclosure.

FIG. 6 illustrates an example system 600 with a controller echo state network and battery model echo state network according to this disclosure. The embodiment of the system 600 illustrated in FIG. 6 is for illustration only. FIG. 6 does not limit the scope of this disclosure to any particular implementation.

Echo state network for battery model 650 has input neurons 615 taking inputs—current 601, voltage 602, temperature 603, time of day 604, load on grid, generator output power 605, grid frequency 606, and phasor data 607. It has an output layer 645 with outputs for state of charge 647, remaining useful life 648, and total cost of charge 649. The inputs 601-607 are sent through a fast Fourier transform 610 to the input neurons 615 in the input layer 616. The objective for optimization is to maximize state of charge 647 while maximizing remaining useful life 648 and minimizing total cost of charge 649. The input neurons of the input layers 616, 636 have weights 619 and 639 applied before the internal reservoir layer 620, 640. The internal reservoir layer 620, 640 has a fixed number of internal neurons 621, 641 whose weights 622, 642 are determined by the configurator neural network.

Echo state networks 650, 655 have weights 622, 642 of the internal reservoir layers 620, 640 fixed and initialized at random. Deviating from random initialization should enable learning from past to be leveraged and result in faster and more accurate convergence of the network while training.

The weights 623, 643 of output layers 626, 646 are trained using the echo state network learning algorithm. Having to train only the weights 622, 642 of output layers 626, 646 results in faster convergence as compared to conventional recurrent neural networks. Such a scheme is also attractive for embedded applications leveraging field programmable gate arrays that are resource constrained for computations. Having to retrain only the output weights is faster than having to retrain weights of all internal neurons 621, 641 as in case of a conventional recurrent neural network. Schematic representation on the battery model echo state network and controller echo state network is shown in FIG. 6.

Methods to compute inverse of echo state networks are based on ESN matrix inversion 475. These methods are applied to generate the charging controller 420. The charging controller 420 will be derived from the battery model 445 and also have an objective to minimize the wasted energy.

An IOT enabled battery charging controller receives data from the grid such as generator output power, including generation from conventional thermal and hydroelectric power plants that generate a constant output power and renewable PV solar and wind power plants that have varying output power over time, time of the day, frequency of the grid, phasor data from IOT enabled synchro-phasors etc.

Figure 7:
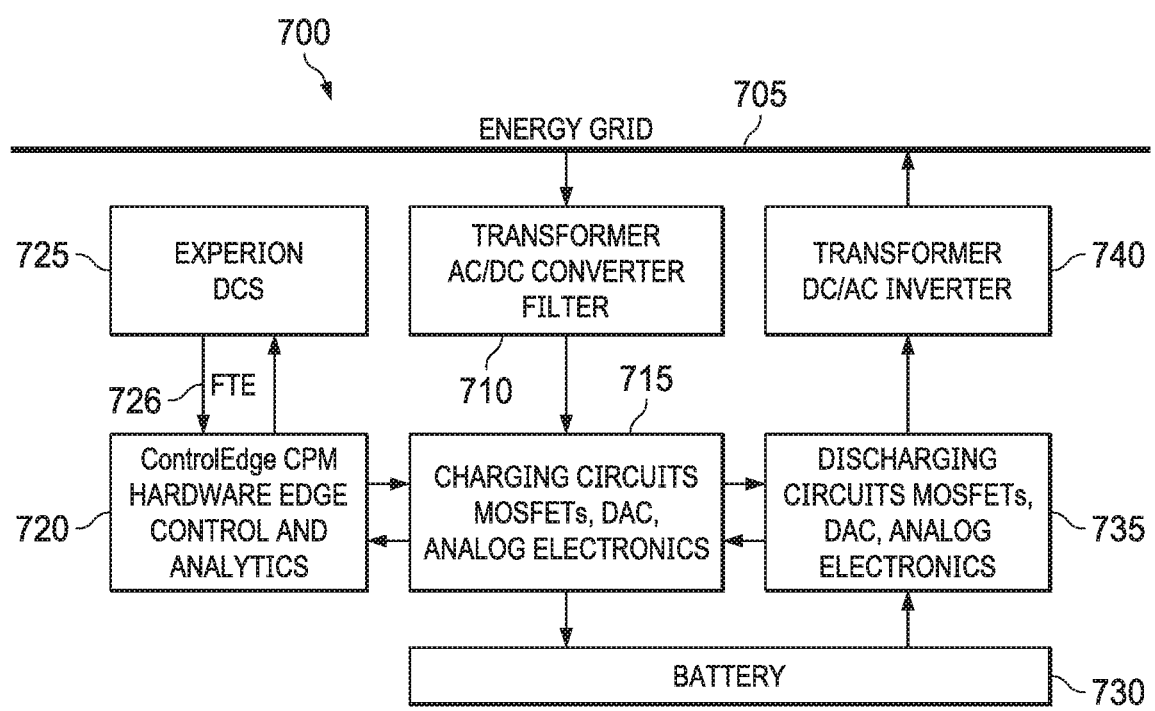
FIG. 7 illustrates an example integration with Experion and FTE according to this disclosure.

FIG. 7 illustrates an example integration 700 with Experion 725 and FTE 726 according to this disclosure. The embodiment of the integration 700 illustrated in FIG. 7 is for illustration only. FIG. 7 does not limit the scope of this disclosure to any particular implementation.

Fault tolerant Ethernet (FTE) 726 is the industrial control network of the Experion process knowledge system. The FTE network connects clusters of groups of nodes, such as servers and stations, typically associated with the same process unit. FTE 726 provides multiple communication paths between these nodes so the network can tolerate all single faults and many multiple faults.

FTE 726 ensures rapid detection and recovery in case of communication failures with a switchover time of less than a second. It allows normal Ethernet nodes to connect to the FTE control network and benefit from its highly available communications environment. With FTE 726, users can leverage commercial Ethernet technology found in IT networks to lower the costs of the FTE control network infrastructure, connections to IT networks and third-party Ethernet devices, and ongoing maintenance and support.

Experion 725 integrates people and processes for better performance; the automation system is designed to merge traditionally disparate functions and systems across the manufacturing enterprise. It captures the knowledge of plant personnel and their workflows to deliver sustainable efficiencies. A common and consistent HMI over the entire process control system provides the essential foundation for improving operator effectiveness. The abnormal situation management (ASM) consortium guidelines embedded in Experion PKS Orion result in better overall collaboration, allowing plant personnel to make better decisions to improve business performance, safety, efficiency and agility.

Energy from the energy grid 705 is transmitted through a transformer, AC/DC converter, and filter apparatus 710 to the charging circuits 715. After the charging circuits 715, the energy is transmitted to the battery 730. The battery 730 discharges the energy to the discharge circuits 735. The excess energy is output from the discharge circuits 735 through a DC/AC converter 740 back to the grid 705

To enhance the value, it is important to integrate the solution with Experion 725 and FTE 726. A prototype leveraging HPS Common Embedded Platform based on Zynq7000 is envisaged to avoid non value add hardware development effort and instead focus on FPGA and software development. Minimal hardware is required to interface CEP/CPM hardware 720 with battery charging circuits 715 that are sourced externally and later integrated later to make a complete solution.

While FPGA based embedded computing enabled real time control, modelling and analytics at the edge, leveraging cloud for further analytics, performed offline and non real-time can enhance the value of the solution.

To minimize the computation latency, IP Packet semantics can be defined so that data can be identified based on its position within a packet and its position relative to other data within the packet. Incoming packets shall be parsed to extract the input data in real time without having to let the packet pass across the memory walls. A simplified diagrammatic representation is shown in FIG. 7.

Figure 8:
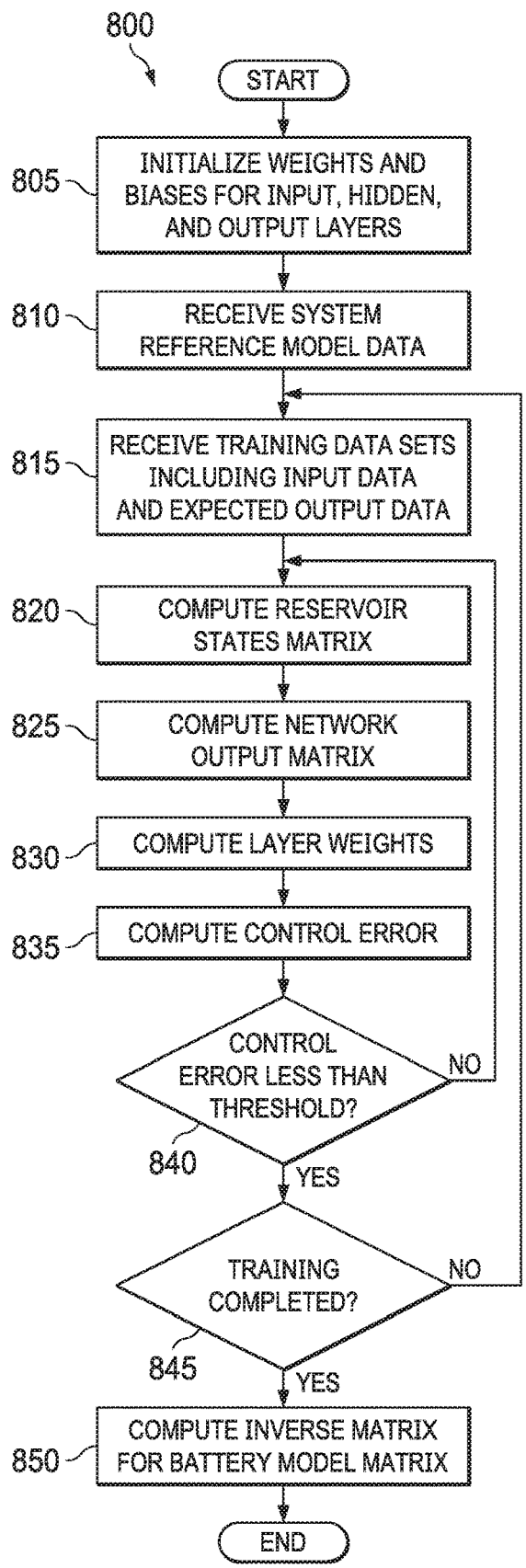
FIG. 8 illustrates an example method for battery model and controller training according to this disclosure.

FIG. 8 illustrates an example method for battery model and controller training according to this disclosure. For example, the process depicted in FIG. 8 may be performed in conjunction with the neural network overlay 325 in FIG. 3 and the ESC system 400 in FIG. 4.

In operation 805, the ESC system 400 initializes weights and biases for the input layers, the hidden layers, and the output layers.

In operation 810, the ESC system 400 receives system reference model data. The system reference model data can include a target state of charge, a remaining useful life, a cost of charge, a grid frequency, and a phasor.

In operation 815, the ESC system 400 receives training data sets including input data and expected output data. The input data can include a charging current, a charging voltage, a temperature of the battery, pricing data, a power demand, a power output from generators, a frequency, and phasor data. The expected output data can include a state of charge, a depth of charge, a remaining useful life, and a cost of charge.

In operation 820, the ESC system 400 computes a reservoir states matrix. The reservoir states matrix can be determined using the following equation:

$$x(t+1)=f\{W\text{in}.u(t+1)+W.x(t)+W\text{back}.y(t)\}$$

where Win is the weight of the input layer, W is the weight of the reservoir or internal layer, and Wback is the weight of the back propagated layer.

In operation 825, the ESC system 400 computes a network output matrix. The network output matrix can be determined using the following equation:

$$y(t+1)=W\text{out}.x(t+1)$$

where Wout is the weight of the output layer.

In operation 830, the ESC system 400 computes layer weights. The layer weights can be determined based on the following equation:

$$W\text{out}=\overline{X}, Y=(X^T X)^{-1} X^T Y$$

In operation 835, the ESC system 400 computes control error. The control error is the difference between the output of the physical plant and the output of the reference model.

In operation 840, the ESC system 400 determines whether the control error is less than a threshold. The threshold can be determined by a user or operator of the system. In some embodiments, the threshold is determined based on operating conditions of the battery. If the control error is not within the threshold, the reservoir states matrix is computed again in operation 820.

In operation 845, the ESC system 400 determines if the training is completed when the control error is within a threshold in operation 840. If the training has not completed, the training data set is read again in operation 815.

In operation 850, the ESC system 400 computes an inverse matrix for a battery model matrix when the training has determined to be completed in operation 845.

Although FIG. 8 illustrates one example of a method 800 for battery model and controller training, various changes may be made to FIG. 8. For example, various steps shown in FIG. 8 could overlap, occur in parallel, occur in a different order, or occur any number of times.

Figure 9:
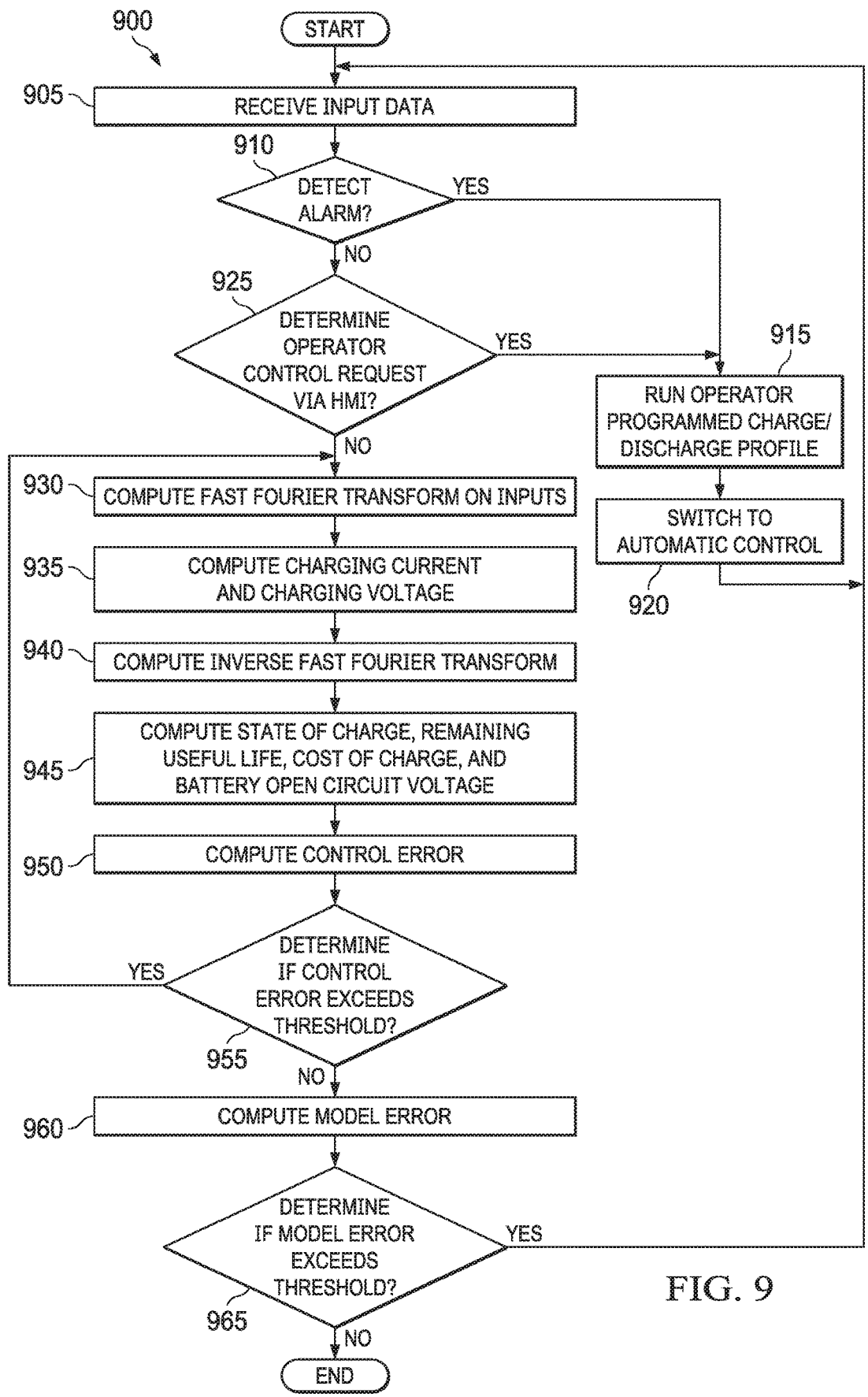
FIG. 9 illustrates an example method for charge control and battery parameter estimation according to this disclosure.

FIG. 9 illustrates an example method for charge control and battery parameter estimation according to this disclosure. For example, the process depicted in FIG. 9 may be performed in conjunction with the neural network overlay 325 in FIG. 3 and the ESC system 400 in FIG. 4.

In operation 905, the ESC system 400 receives input data. The input data can include a power demand, a power output (from generators), a time, pricing, grid frequency, phasor data, temperature. The ESC system 400 also can read any system alarms.

In operation 910, the ESC system 400 detects an alarm. Different alarms that the ESN could detect can include a temperature overrun, an under voltage condition, an over voltage condition, an under current condition, an over current condition, a flash failure, a cell imbalance, and a FET or fuse failure.

In operation 915, the ESC system 400 runs an operator programmed charge and discharge profile when an alarm is detected in operation 910. In operation 920, the ESC system 400 switches to automatic control. Once in automatic control, the ESC system 400 continues to read system alarms in operation 905.

In operation 925, the ESC system 400 determines whether an operator control request via HMI has been initiated when an alarm is not detected in operation 910. If the ESN determines that an operator requests control via HMI, the ESN returns to run operator programmed charge/discharge profile in operation 915. If the ESN determines that an operator does not request control via the HMI, the ESC system 400 proceeds to operation 930.

In operation 930, the ESC system 400 computes a fast Fourier transform on the inputs. The inputs are transformed from an original time domain into a frequency domain.

In operation 935, the ESC system 400 computes a charging current and a charging voltage. The charging current and charging voltage are used in regulating the energy storage rate of the battery. The charging controller ESN receives the inputs and the outputs of the battery to determine the charging current and the charging voltage. The computation can be offloaded to the neural network accelerator overlay.

In operation 940, the ESC system 400 computes an inverse fast Fourier transform. The inverse fast Fourier transform is used to transform the charging current and charging voltage from the frequency domain to the original time domain.

In operation 945, the ESC system 400 computes a state of charge, a remaining useful life, a cost of charge, and a battery open circuit voltage. The state of charge, remaining useful life, and cost of charging are determined by the battery model ESN.

In operation 950, the ESC system 400 computes a control error. The control error is the difference of the output of the battery and the output of the reference model. The computations for the state of charge (SoC), a remaining useful life (RUL), a cost of charge (CoC), and a battery open circuit voltage can be offloaded to the neural network accelerator overlay.

In operation 955, the ESC system 400 determines whether a control error exceeds a threshold. The ESN matrix inversion uses the control error to adjust the charging controller ESN. The control error can be computed using the following equation:

error=$f$(Inferred SoC,RUL,COC)−$f$(Reference(Target) Soc,RUL,COC

In operation 960, the ESC system 400 computes a model error. The model error is the difference between the output of the battery and the output of the battery model ESN.

In operation 965, the ESC system 400 determines whether a model error exceeds a threshold. The ESN learning algorithm uses the model error to determine the output weights and the battery model ESN configurator uses the model error to determine the internal weights of the neural network used in the battery model ESN.

Although FIG. 9 illustrates one example of a method 900 for charge control and battery parameter estimation, various changes may be made to FIG. 9. For example, various steps shown in FIG. 9 could overlap, occur in parallel, occur in a different order, or occur any number of times.

Figure 10:
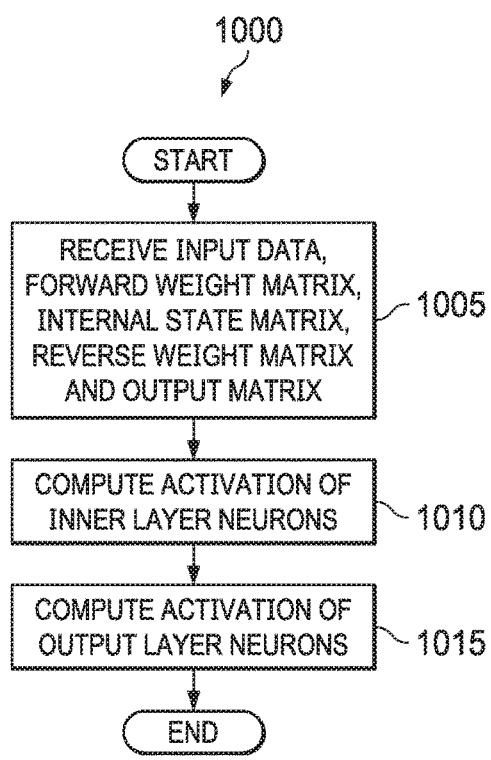
FIG. 10 illustrates an example method for configuring a neural network overlay with acceleration offload according to this disclosure.

FIG. 10 illustrates an example method for configuring a neural network overlay with acceleration offload according to this disclosure. For example, the process depicted in FIG. 10 may be performed in conjunction with the neural network overlay 325 in FIG. 3 and the ESC system 400 in FIG. 4.

In operation 1005, the ESC system 400 receives input data, a forward weight matrix, an internal state matrix, reverse weight matrix, and an output matrix.

In operation 1010, the ESC system 400 computes an activation of inner layer neurons. The activation of the inner layer neurons can be determined based on the following equation:

$x(t+1)=f\{W\text{in}.u(t+1)+W.x(t)+W\text{back}.y(t)\}$

In operation 1015, the ESC system 400 computes an activation of output layer neurons. The activation of the output layer neurons can be calculated by the following equation:

$y(t+1)=f_{out}x(t+1)+W.u(t+1)+W\text{back}.y(t))$

Although FIG. 10 illustrates one example of a method 1000 for configuring a neural network overlay with acceleration offload, various changes may be made to FIG. 10. For example, various steps shown in FIG. 10 could overlap, occur in parallel, occur in a different order, or occur any number of times.

Figure 11:
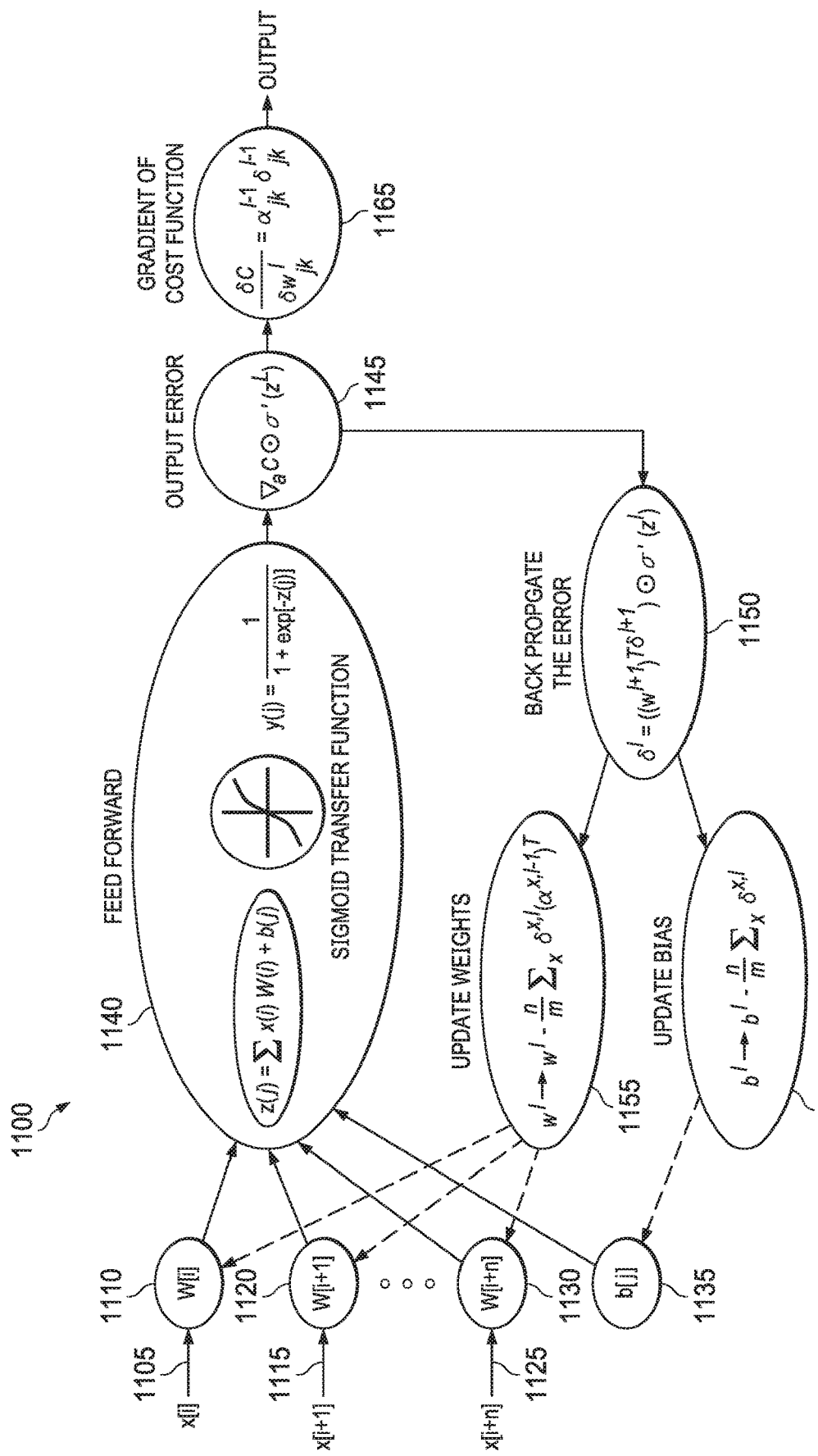
FIG. 11 illustrates an example method for configuring a battery model ESN neural network with feed forward according to this disclosure.

FIG. 11 illustrates an example method 1100 for configuring a battery model ESN neural network with feed forward according to this disclosure. For example, the process depicted in FIG. 11 may be performed in conjunction with the neural network overlay 325 in FIG. 3 and the ESC system 400 in FIG. 4.

The method receives inputs x(i) 1105, x(i+1) 1115, and x(i+n) 1125. Weights W are respectively applied to the inputs 1105, 1115, 1125 to end up with weight inputs W(i) 1110, W(i+1) 1120, and W(i+n) 1130. The weighted inputs 1110, 1120, 1130 are fed into a feed forward 1140 along with the biases b(j) 1135. The feed forward 1140 performs the following computations on the weighted inputs:

$$z(j) = \sum x(i)W(i) + b(j)$$
$$y(j) = \frac{1}{1 + \exp('-z(j))}$$

The output error 1145 determines an output error $\nabla_a C$ from the output of the feed forward 1140. The output error $\nabla_a C$ is determined by:

$$\nabla_a C \odot \sigma'(z^L)$$

The output error is then used by the gradient of cost function 1165 and the back propagate error 1150.

$$\delta^l = (w^{l+1})^{T\delta^{l+1}} \odot \sigma'(z^L)$$

The back propagate error $\delta^l$ 1150 is output to the update weight 1155 and an updated bias 1160. The weights are updated according to:

$$w^l \to w^l - \frac{n}{m} \sum_x \delta^{x,l}(a^{x,l-1})^T$$

The biases $b^l$ are updated according to:

$$b^l \to b^l - \frac{n}{m} \sum_x \delta^{x,l}$$

The updated biases $b^l$ are used as the biases 1135 input to the feed forward 1140. The output error $\nabla_a C$ is also used in a gradient of cost function 1165 by the following equation:

$$\frac{\delta C}{\delta w^l_{jk}} = a^{l-1}_k \delta^l_j$$

The gradient of cost $$\frac{\delta C}{\delta w^l_{jk}}$$

is used as output from me battery model ESN configurator neural network.

Although FIG. 11 illustrates one example of a method 1100 for configuring a battery model ESN neural network with feed forward, various changes may be made to FIG. 11. For example, various steps shown in FIG. 11 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An energy storage system comprising:
    a battery configured to store and expend energy with an electrical grid;
    a charging circuit configured to regulate a rate of energy stored in the battery; and
    an energy storage controller (ESC) coupled to the battery and the charging circuit, and configured to:
    receive energy storage controller inputs;
    determine a control error of the battery based on the energy storage controller inputs used in a charging controller echo state network, an output of the battery and a reference model output;
    determine a model error of the battery based on the energy storage controller inputs used in a battery model echo state network, an output of the battery and an output of the battery model echo state network;
    adjust the regulated rate of energy that the charging circuit stores in the battery based on the control error and the model error; and
    wherein inputs to the charging controller echo state network include controller inputs transformed into a frequency domain using a fast Fourier transform, an output of the battery, inverse matrix of the battery model echo state network and the control error, which is minimized to below a predetermined threshold.

2. The energy storage system of claim 1, wherein the control error is a difference between an output of the battery and a reference model output.

3. The energy storage system of claim 1, wherein the model error is a difference between an output of the battery and an output of the battery model echo state network.

4. The energy storage system of claim 1, wherein the charging controller echo state network is an inverse of the battery model echo state network.

5. The energy storage system of claim 1, wherein inputs to the battery model echo state network include an output of the charging controller echo state network transformed to an original time domain using an inverse fast Fourier transform, reservoir weights determined from a battery model echo state network configurator, and output layer weights from an echo state network learning algorithm.

6. The energy storage system of claim 5, wherein the reservoir weights are determined using a back propagation algorithm on the output of the charging controller echo state network transformed to the original time domain using the inverse fast Fourier transform and the model error.

7. A method of an energy storage controller in an energy storage system, the method comprising:
    receiving energy storage controller inputs;
    determining a control error of a battery based on the energy storage controller inputs used in a charging controller echo state network, an output of the battery and a reference model output;
    determining a model error of the battery based on the energy storage controller inputs used in a battery model echo state network, an output of the battery and an output of the battery model echo state network;
    adjusting a rate of energy that a charging circuit stores in the battery based on the control error and the model error; and
    wherein inputs to the charging controller echo state network include controller inputs transformed into a frequency domain using a fast Fourier transform, an output of the battery, inverse matrix of the battery model echo state network and the control error, which is minimized to below a predetermined threshold.

8. The method of claim 7, wherein the control error is a difference between an output of the battery and a reference model output.

9. The method of claim 7, wherein the model error is a difference between an output of the battery and an output of the battery model echo state network.

10. The method of claim 7, wherein the charging controller echo state network is an inverse of the battery model echo state network.

11. The method of claim 7, wherein inputs to the battery model echo state network include an output of the charging controller echo state network transformed to an original time domain using an inverse fast Fourier transform, reservoir weights determined from a battery model echo state network configurator, and output layer weights from an echo state network learning algorithm.

12. The method of claim 11, wherein the reservoir weights are determined using a back propagation algorithm on the output of the charging controller echo state network transformed to the original time domain using the inverse fast Fourier transform and the model error.

13. A non-transitory machine-readable medium encoded with executable instructions that, when executed, cause one or more processors to:
    receive energy storage controller inputs;
    determine a control error of the battery based on the energy storage controller inputs used in a charging controller echo state network, an output of the battery and a reference model output;
    determine a model error of the battery based on the energy storage controller inputs used in a battery model echo state network, an output of the battery and an output of the battery model echo state network;
    adjust the regulated rate of energy that the charging circuit stores in the battery based on the control error and the model error; and
    wherein inputs to the charging controller echo state network include controller inputs transformed into a frequency domain using a fast Fourier transform, an output of the battery, inverse matrix of the battery model echo state network and the control error, which is minimized to below a predetermined threshold.

14. The non-transitory machine-readable medium of claim 13, wherein the control error is a difference between an output of the battery and a reference model output.

15. The non-transitory machine-readable medium of claim 13, wherein the model error is a difference between an output of the battery and an output of the battery model echo state network.

16. The non-transitory machine-readable medium of claim 13, wherein the charging controller echo state network is an inverse of the battery model echo state network.

17. The non-transitory machine-readable medium of claim 13, wherein inputs to the battery model echo state network include an output of the charging controller echo state network transformed to an original time domain using an inverse fast Fourier transform, reservoir weights determined from a battery model echo state network configurator, and output layer weights from an echo state network learning algorithm.

* * * * *